(12) United States Patent
Baumgartner et al.

US006334177B1

(10) Patent No.: US 6,334,177 B1
(45) Date of Patent: Dec. 25, 2001

(54) METHOD AND SYSTEM FOR SUPPORTING SOFTWARE PARTITIONS AND DYNAMIC RECONFIGURATION WITHIN A NON-UNIFORM MEMORY ACCESS SYSTEM

(75) Inventors: Yoanna Baumgartner, Austin; Alvaro Eduardo Benavides, Round Rock; Mark Edward Dean; John Thomas Hollaway, Jr., both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,223

(22) Filed: Dec. 18, 1998

(51) Int. Cl.[7] .................................................. G06F 13/14
(52) U.S. Cl. ................................................ 712/13; 709/221
(58) Field of Search .............................. 712/13; 709/221, 709/226, 232, 238

(56) References Cited

U.S. PATENT DOCUMENTS

| | | | |
|---|---|---|---|
| 5,710,907 | * 1/1998 | Hagersten | 711/148 |
| 5,727,150 | 3/1998 | Laudon et al. | 709/170 |
| 5,784,697 | 7/1998 | Funk et al. | 711/215 |
| 5,787,468 | 7/1998 | Clark | 711/121 |
| 5,867,649 | * 2/1999 | Larson | 709/201 |
| 5,931,938 | * 8/1999 | Drogichen | 712/15 |
| 6,021,479 | * 2/2000 | Stevens | 711/170 |
| 6,047,316 | * 4/2000 | Barton | 709/216 |
| 6,075,938 | * 6/2000 | Bugunion | 709/214 |
| 6,081,874 | * 6/2000 | Carpenter | 711/141 |

* cited by examiner

Primary Examiner—Eric Coleman
(74) Attorney, Agent, or Firm—Casimer K. Salys; Bracewell & Patterson, L.L.P.

(57) ABSTRACT

A method for supporting software partition and dynamic reconfiguration within a non-uniform memory access (NUMA) computer system is disclosed. A NUMA computer system includes multiple nodes coupled to an interconnect. Each of the nodes includes a NUMA bridge, a local system memory, and at least one processor having at least a local cache memory. Multiple groups of software partitions are formed within the NUMA computer system, and each of the software partitions is formed by a subset of the nodes. A destination map table is provided in a NUMA bridge of each of the nodes for keeping track of the nodes within a software partition. A command is forwarded to only the nodes within a software partition.

18 Claims, 4 Drawing Sheets

| DESTINATION ID | S | E |
|---|---|---|
|  |  |  |
|  |  |  |
|  |  |  |
|  |  |  |
|  |  |  |

Fig. 2

METHOD AND SYSTEM FOR SUPPORTING SOFTWARE PARTITIONS AND DYNAMIC RECONFIGURATION WITHIN A NON-UNIFORM MEMORY ACCESS SYSTEM

BACKGROUND OF THE INVENTION

1. Technical Field

The present invention relates to a method and system for data processing in general, and in particular to a method and system for providing support for software partitioning. Still more particularly, the present invention relates to a method and system for supporting software partition and dynamic reconfiguration within a non-uniform memory access system.

2. Description of the Prior Art

With the ever increasing demand for computing power, computer architectures are driven from uniprocessor designs towards multiprocessor designs. While uniprocessor systems are typically limited to processing only a few instructions simultaneously, a multiprocessor system can execute more instructions in parallel with a higher processing speed.

Within a multiprocessor system, a group of processors is typically defined as a node where each processor within the node may concurrently execute instructions from one or more processes to enable efficient parallel processing of those processes. Some advanced multiprocessor systems may even assign processes to different nodes within the multiprocessor system in order to provide more efficient parallel processing of multiple processes.

In a tightly coupled multiprocessor system, all processors, which share a single memory system, are typically interconnected by a high-speed, circuit-switched interconnection network. The processors are also controlled by the same control program and can communicate directly with each other. When an application program spawns several tasks, the operating system may assign these tasks to different processors. For processes that do not generate subprocesses, a multi-tasking operating system can regard all processors of a multiprocessor system as a simple set of computational resources.

An emerging memory architecture stemming from the class of tightly coupled multiprocessor systems is known as a non-uniform memory access (NUMA) architecture. The NUMA architecture provides overall speed advantages that are not seen in the prior art multiprocessor systems. Also, the NUMA architecture can combine massive scalability of hundreds of processors with the simplified programming model of symmetric multiprocessor (SMP) technology. Generally speaking, a NUMA computer system is a set of SMP nodes interconnected with a high bandwidth interconnection that allows all processors to access any of the main memory within the NUMA computer system. Each processor node shares the same addressable main storage, which is distributed among all the local memory of all the processor nodes. The access time to the local memory within a processor node is the same for all processors within the processor node. Access to a memory on another processor node, however, has a much greater access latency than a similar access to a local memory. Given this greater latency of accesses to the non-local memory, system performance could be enhanced if the memory management facility of the operating system is capable of managing the use of data storage such that the percentage of memory accesses to non-local memories are minimized.

More precisely, a NUMA computer system can be characterized as an interconnection of a set of SMP nodes, with each SMP node containing:

a) 0 to N processors;

b) cache memories, connected individually to each processor and/or to subsets of a node's processors;

c) a main memory; and d) potentially one or more connections to I/O busses and devices.

The contents of every node's main storage is accessible by all processors within the NUMA computer system. The contents of the main storage in processor caches (or caches of processor subsets) is capable of remaining coherent with all changes made to the contents of any local memory. The term "local" is defined to mean those processors and main memory that are on the same processor node and the term "non-local" as main memory and processors that are on different nodes. The access time (cache linefill latency for example) for a processor to read or write the contents of a main memory that is local tends to be faster than the access time to a non-local main memory. Storage ordering and atomicity can also be maintained.

The present disclosure is related to a method and system for supporting software partition and dynamic reconfiguration within a NUMA computer system.

SUMMARY OF THE INVENTION

In accordance with the method and system of the present invention, a NUMA computer system includes multiple nodes coupled to an interconnect. Each of the nodes includes a NUMA bridge, a local system memory, and at least one processor having at least a local cache memory. Multiple groups of software partitions are formed within the NUMA computer system, and each of the software partitions is formed by a subset of the nodes. A destination map table is provided in a NUMA bridge of each of the nodes for keeping track of the nodes within a software partition. A command is forwarded to only the nodes within a software partition.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is a block diagram of a Destination Map Table, in accordance with a preferred embodiment of the present invention;

DETAILED DESCRIPTION OF A PREFERRED EMBODIMENT

Figure 1:
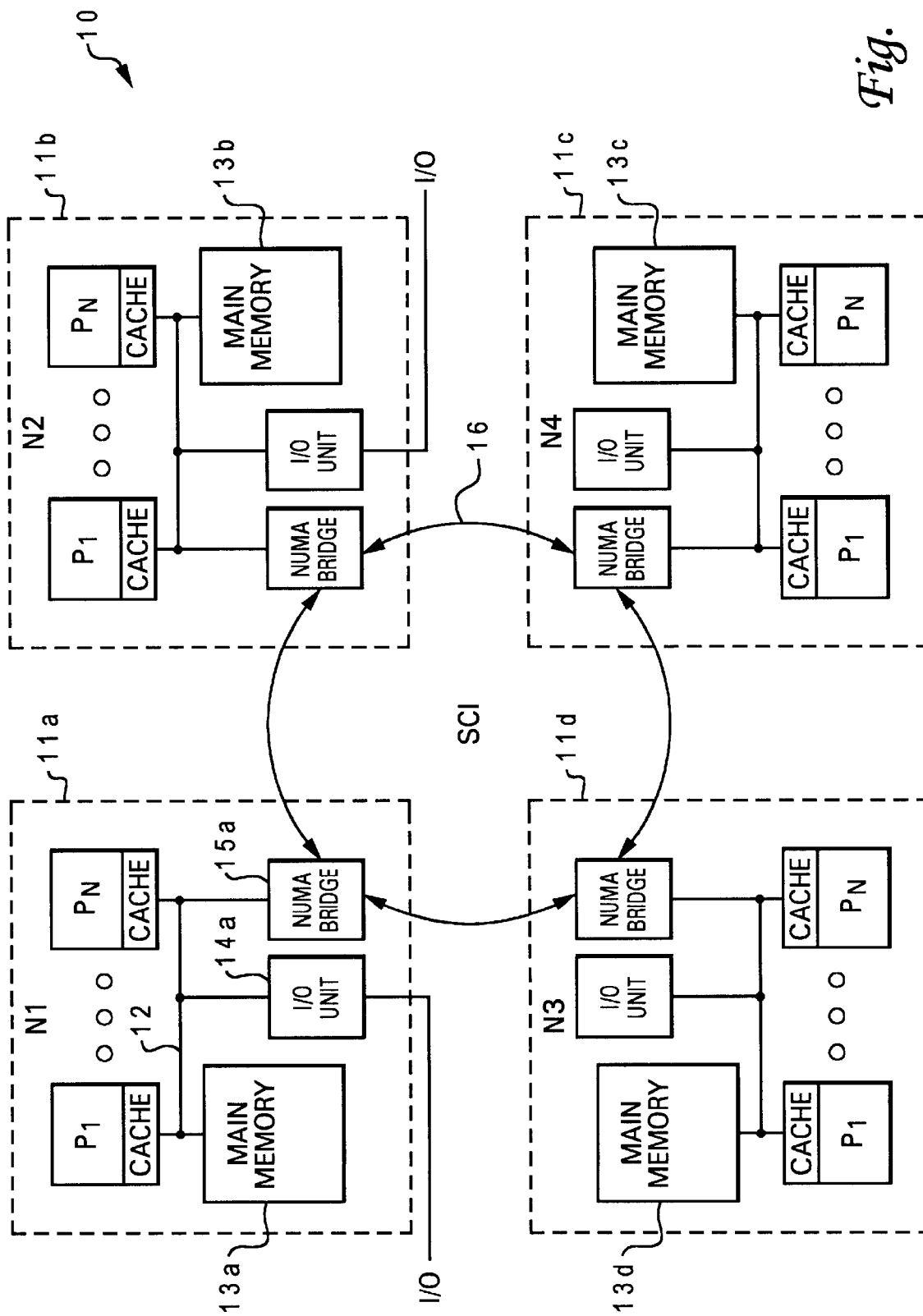
FIG. 1 is a block diagram of a multiprocessor system having a non-uniform memory access architecture, in which a preferred embodiment of the present invention may be utilized.

Referring now to the drawings and in particular to FIG. 1, there is depicted a block diagram of a shared-memory multiprocessor system having a non-uniform memory access (NUMA) architecture, in which a preferred embodiment of the present invention may be utilized. As shown, a NUMA multiprocessor system 10 includes four nodes, namely, node 11a, node 11b, node 11c, and node 11d. Each of nodes 11a–11d has at least one processor connected to a local memory within the node via an intra-node connection mechanisms such as a special bus or a crossbar switch. For example, multi-processor node 11a contains processors $P_1$–$P_N$ along with their respective cache memory connected to a main memory 13a that is local to processors $P_1$–$P_N$ via an intra-node bus 12. Each of nodes 11a–11d also contain an I/O unit for supporting connection to I/O peripherals such as printers, communication links, workstations, or direct access storage devices (DASD). For example, node 11a contains an I/O unit 14a.

All nodes 11a–11d are interconnected by a Scalable Coherent Interconnect (SCI) 16. SCI 16 is a high-bandwidth interconnection network capable of providing cache coherence throughout NUMA multiprocessor system 10. Each of nodes 11a–11d has a NUMA bridge, such as a NUMA bridge 15a in node 11a, to provide connections to SCI 16 in order to maintain inter-nodal connection among nodes 11a–11d.

All processors within NUMA multiprocessor system 10 share an identical addressable main memory, which is distributed among nodes 11a–11d as local main memories 13a–13d. Because all local main memories 13a–13d are accessible by all the processors within NUMA multiprocessor system 10, the total addressable main memory space within NUMA multiprocessor system 10 includes the combination of all local main memories 13a–13d. Each byte of system main memory can be addressable by a unique real address. The bus logic for each of nodes 11a–11d monitors all memory accesses by the processors and the I/O unit within a node and then directs each local memory access to the node's local main memory. Remote accesses to a non-local main memory are sent to SCI 16 via a NUMA bridge 15 within the requesting node.

Within the NUMA architecture, various multiprocessor nodes can be grouped into different software partitions by an operating system via a process known as software partitioning, as it is well-known to those skilled in the relevant art. Details of the software partitioning process can be found in "System 390 PR/SM Planning Guide" (Order Number: GA22-7236-3), the pertinent of which is incorporated herein by reference.

Although the exact number of nodes contained within each software partition is application specific, there is typically a maximum number of nodes that can be included within a software partition. For example, a NUMA multiprocessor system may be able to support only up to 256 nodes and only a maximum of 16 nodes can be included in a software partition. Thus, a NUMA bridge of each node needs a method (or hardware logic) to determine which nodes within the NUMA multiprocessor system belongs to its software partition for instructions such as Sync and TLBSync and for command forwarding and error indication forwarding. In addition, a coherency directory within the NUMA bridge also needs a method (or hardware logic) to determine which nodes within the NUMA multiprocessor system are valid to maintain cache coherency after a dynamic reconfiguration. Dynamic reconfiguration is a process of adding or removing a node to a NUMA multiprocessor system while other operations are being performed.

As a preferred embodiment of the present invention, a destination map table is implemented in each NUMA bridge within a NUMA multiprocessor system for supporting software partitioning and dynamic reconfiguration. The destination map table is preferably initialized by software such as the operating system.

Figure 2:
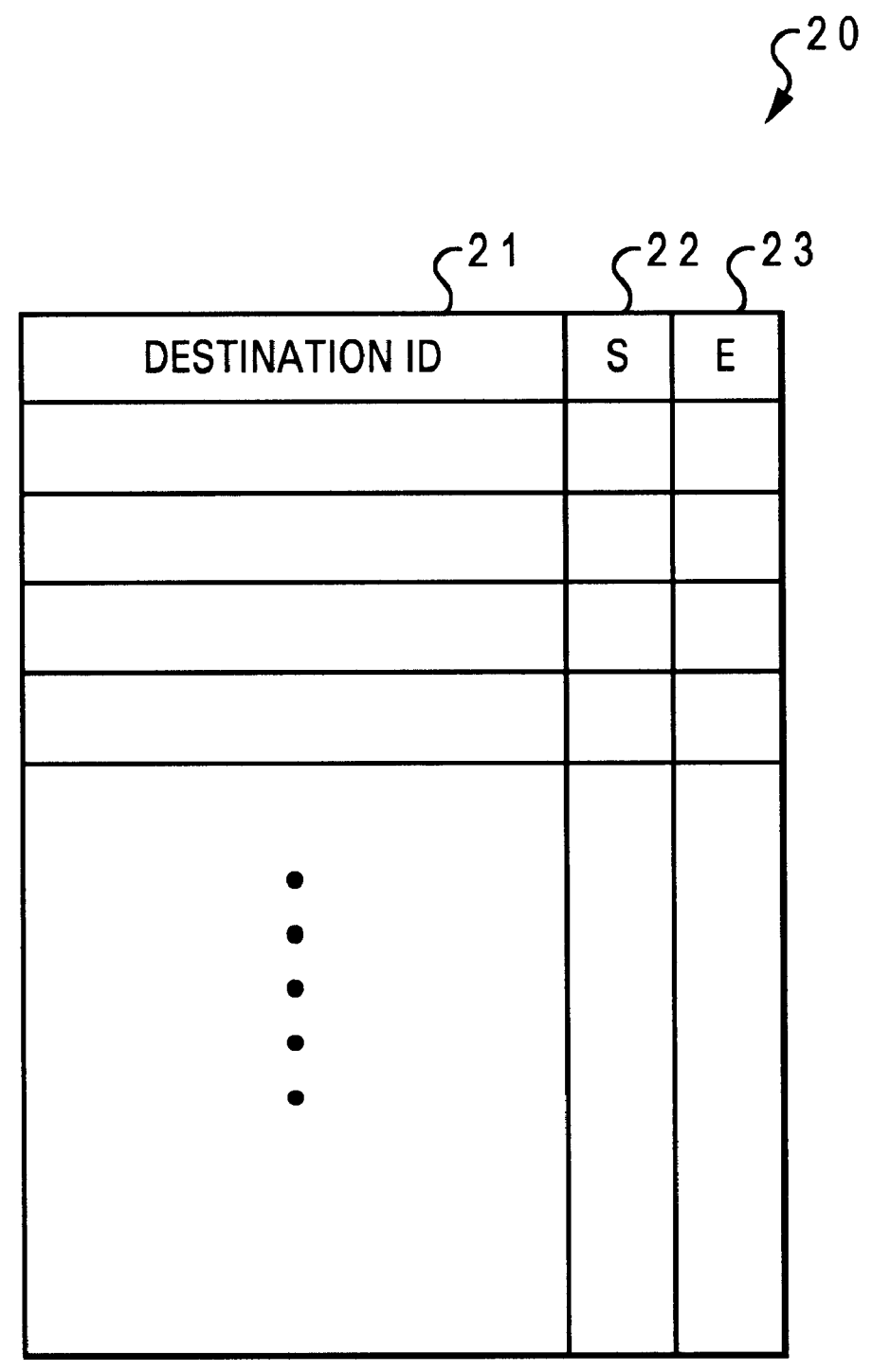

With reference now to FIG. 2, there is illustrated a block diagram of a destination map table, in accordance with a preferred embodiment of the present invention. As shown, a destination map table 20 includes three fields, namely, a destination identification (ID) field 21, an S field 22, and an E field 23. Destination ID field 21 contains actual node identifications (node IDs) used by a SCI, such as SCI 16 in FIG. 1, connected to all nodes within the NUMA multiprocessor system. The length of the node IDs depends on the total number of nodes a NUMA multiprocessor system is capable of supporting. For example, a NUMA multiprocessor system having 8-bit of node IDs is capable of supporting up to 256 nodes. S field 22 contains a bit for indicating that a destination node (i.e., a remote node) is valid for broadcasts and coherency operations, such as a Sync operation. E field 23 contain a bit for indicating that a destination (i.e., a node) is valid for Machine Check and Checkstop broadcasts to indicate error conditions. The number of entries of destination map table 20 defines a maximum number of nodes within a software partition. For example, a destination map table having 16 entries defines the maximum number of nodes within a software partition to be 16.

Destination map table 20 is used differently by various logic sections of a NUMA bridge in a node within a NUMA multiprocessor system as follows.

A. Address Decoding and Routing

When a command is received by a NUMA bridge from a remote node across an SCI, the Source node ID of the command is sent to a coherency manager of the NUMA bridge, where the command is placed on a local intra-node address bus within a local node. The coherency manager will then compare the Source node ID with each destination ID within destination field 21 of destination map table 20 in order to determine an index that can be utilized as a pseudo node ID for indexing to an entry within a coherency directory of the NUMA bridge. The index of destination map table 20 is the relative position of an entry having a destination ID that matches the Source node ID. For example, if the fifth entry of destination map table 20 contains a destination ID that matches with the Source node ID of the command, then the index that can be utilized as a pseudo node ID for indexing to an entry within the coherency directory of the NUMA bridge is "5."

As for routing, when the NUMA bridge determines that an operation must be forwarded to a remote node, the address range decode will include the index (i.e., the pseudo node ID) for indexing into destination map table 20. The command will subsequently be forwarded to a remote node that is identified by the destination ID according to the index to an entry within destination map table 20.

B. Software Partitioning

As mentioned above, each NUMA bridge within the NUMA multiprocessor system contains a destination map table; and each destination map table keeps track of all nodes within its software partition by setting the S field associated with the destination ID field of the nodes valid. When a Sync or TLBSync command is received from the local interconnect, the NUMA bridge must interrogate each S bit in S field 22 within destination map table 20. An Output Request Manager for the SCI will then forward the command only to those remote nodes that have their respective S bit set in S field 22 within destination map table 20 of the sending node.

If the S bit in S field 22 is not set for the corresponding node, or if the Source node ID does not match any of the Destination ID in destination ID field 21 of destination map table 20, then the cache coherency directory will not maintain cache information for that node. Remote nodes that are not within the software partition may access the local memory and receive the latest coherent data, however, their access of the data will not be recorded in the cache coherency directory of the NUMA bridge.

Similarly, if a forwardable Machine Check or Checkstop condition is received, the error handling logic within the NUMA bridge must also interrogate each E bit in E field 23 within destination map table 20. The Output Request Manager for the SCI will then forward the error indications only to those destination nodes that have respective E bit set in E field 23 within destination map table 20 of the sending node.

Figure 3:
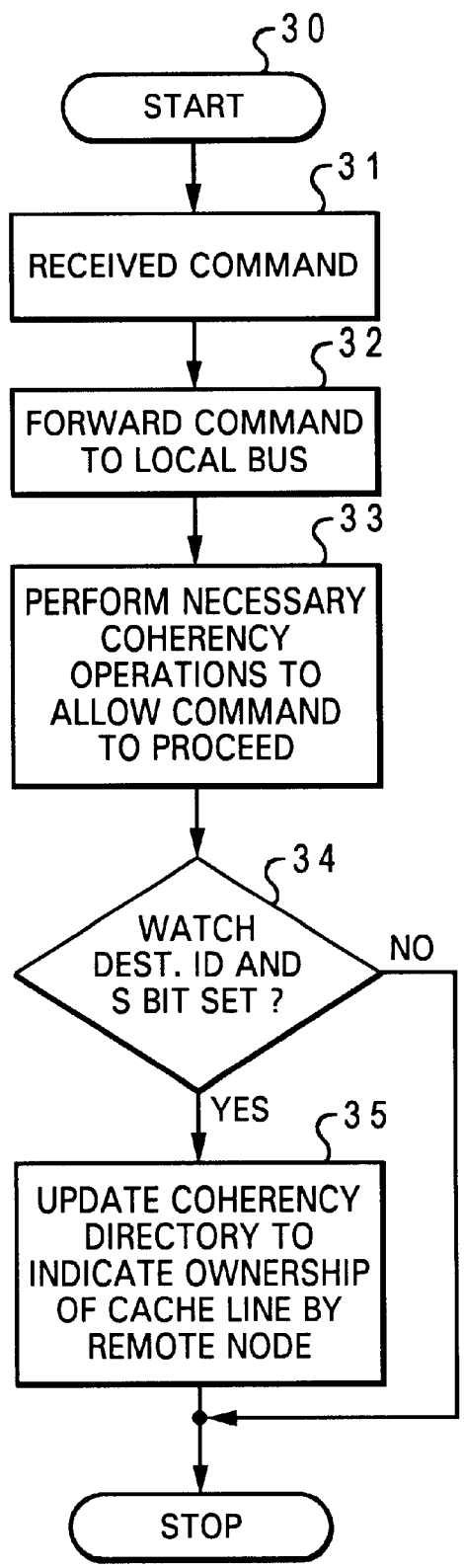
FIG. 3 is a high-level logic flow diagram for supporting software partition within a NUMA computer system, in accordance with a preferred embodiment of the present invention.

Referring now to FIG. 3, there is illustrated a high-level logic flow diagram for supporting software partitions within a NUMA computer system, in accordance with a preferred embodiment of the present invention. Starting at block 30, a command is received by a node from the SCI, as shown in block 31. The received command can be a request or an error condition. The received command is then forward to a local bus (such as intra-node 12 in FIG. 1), as depicted in block 32. Subsequently, necessary coherency operations are performed to allow the received command to proceed, as illustrated in block 33. Each destination ID with the destination ID field of the destination map table (from FIG. 2) is then interrogated to determine whether or not there is a "match" with the node ID(s) of the received command and whether or not the S bit of the matched node ID(s) is set, as depicted in block 34. If there is a match with the node ID(s) of the received command and the S bit is set for the matched node ID, the coherency directory is update to indicate ownership of the corresponding cache line for the matched node ID(s), as illustrated in block 35; otherwise, the process is completed.

C. Dynamic Reconfiguration

Dynamic reconfiguration support requires the ability to remove or add a node to a NUMA multiprocessor system during the performance of other operations. When a node is removed, the coherency directories at other nodes within the NUMA multiprocessor system may contain erroneous information indicating that the removed node has modified or shared data. When removing a node, the cache memories of that node must be "flushed," by the operating system, and the S bit of that node must be turned off, also by the operating system, in destination map table 20 of all the other nodes within its software partition. Incidentally, when the coherency manager on another node reads an entry in the cache coherency directory, the coherency manager will disregard and clear any node information for nodes that do not have their respective S bit set. Otherwise, coherency operations may be forwarded to a non-existent node, forcing an error condition.

Figure 4:
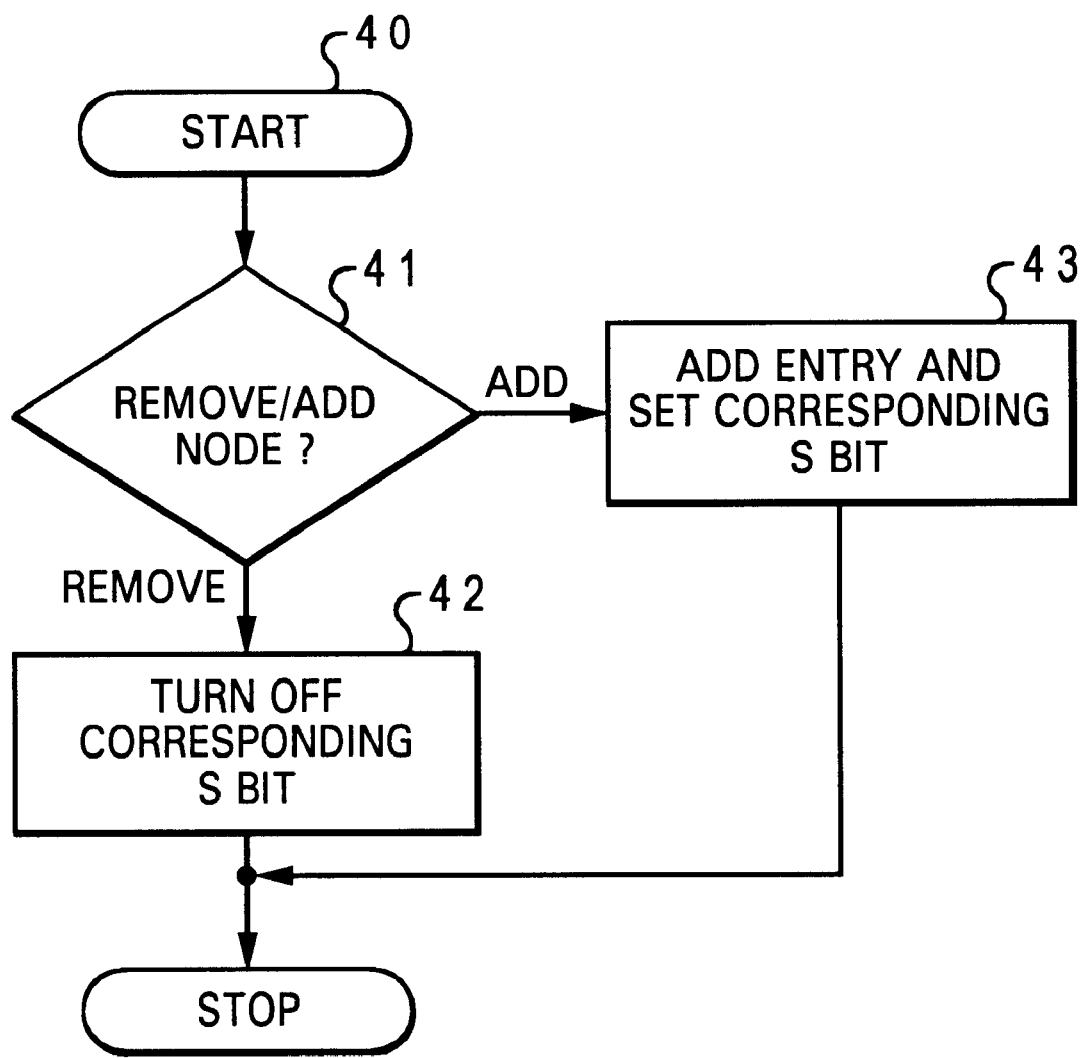
FIG. 4 is a high-level logic flow diagram for supporting dynamic reconfiguration within a NUMA computer system, in accordance with a preferred embodiment of the present invention.

With reference now to FIG. 4, there is illustrated a high-level logic flow diagram for supporting dynamic reconfiguration within a NUMA computer system, in accordance with a preferred embodiment of the present invention. Starting at block 40, a determination is made as to whether or not a node is being removed from or added to a software partition, as shown in block 41. If a node is being removed from the software partition, the S bit of the entry of the corresponding destination ID in the destination map table of each node in the same software partition is turned off, as depicted in block 42. If a node is being added to the software partition, a destination ID of the multiprocessor mode is added to the destination map table of each node in the same software partition and the corresponding S bit is set, as illustrated in block 43.

As has been described, the present invention provides an improved method and system for supporting software partition and dynamic reconfiguration within a NUMA multiprocessor system.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for supporting software partitions and dynamic reconfiguration within a non-uniform memory access (NUMA) computer system, said method comprising the step of:

forming a plurality of software partitions within said NUMA computer system, wherein said NUMA computer system includes a plurality of nodes coupled to an interconnect, wherein each of said plurality of nodes includes a NUMA bridge and a local interconnect, wherein each of said plurality of software partitions associates with a subset of said plurality of nodes;

providing a destination map table in a NUMA bridge of each of said plurality of nodes, wherein said destination map table keeps track of a subset of said plurality of nodes associated with a software partition; and forwarding a command to nodes associated with a software partition as defined by said destination map table.

2. The method according to claim 1, wherein said destination map table includes a destination ID field, an S field, and an E field.

3. The method according to claim 1, wherein said command is a request.

4. The method according to claim 1, wherein said command is an error condition.

5. The method according to claim 1, wherein said method further includes a step of dynamically changing a number of nodes within a software partition.

6. The method according to claim 1, wherein at least one of said plurality of software partition includes a plurality of nodes.

7. A non-uniform memory access (NUMA) computer system capable of supporting software partition and dynamic reconfiguration, said NUMA computer system comprising:

a plurality of nodes coupled to an interconnect, wherein each of said plurality of nodes includes a NUMA bridge and a local interconnect;

means for forming a plurality of software partitions within said NUMA computer system, wherein each of said plurality of software partitions associates with a subset of said plurality of nodes;

a destination map table in a NUMA bridge of each of said plurality of nodes, wherein said destination map table keeps track of a subset of said plurality of nodes associated with a software partition; and means for forwarding a command to nodes associated with a software partition as defined by said destination map table.

8. The computer system according to claim 7, wherein said destination map table includes a destination ID field, an S field, and an E field.

9. The computer system according to claim 7, wherein said command is a request.

10. The computer system according to claim 7, wherein said command is an error condition.

11. The computer system according to claim 7, wherein said computer system further includes a means for dynamically changing a number of nodes within a software partition.

12. The computer system according to claim 7, wherein at least one of said plurality of software partition includes a plurality of nodes.

13. A computer program product residing on a computer usable medium for supporting software partition and dynamic reconfiguration within a non-uniform memory access (NUMA) computer system, said computer program product comprising:

program code means for forming a plurality of software partitions within said NUMA computer system, wherein said NUMA computer system includes a plurality of nodes coupled to an interconnect, wherein each of said plurality of nodes includes a NUMA bridge and a local interconnect, wherein each of said plurality of software partitions associates with a subset of said plurality of nodes;

program code means for providing a destination map table in a NUMA bridge of each of said plurality of nodes, wherein said destination map table keeps track of a subset of said plurality of nodes associated with a software partition; and program code means for forwarding a command to nodes associated with a software partition as defined by said destination map table.

14. The computer program product according to claim 13, wherein said destination map table includes a destination ID field, an S field, and an E field.

15. The computer program product system according to claim 13, wherein said command is a request.

16. The computer program product according to claim 13, wherein said command is an error condition.

17. The computer program product according to claim 13, wherein said computer program product further includes a program code means for dynamically changing a number of nodes within a software partition.

18. The computer program product according to claim 13, wherein at least one of said plurality of software partition includes a plurality of nodes.

* * * * *